US006419551B1

United States Patent
Smith (10) Patent No.: US 6,419,551 B1
(45) Date of Patent: Jul. 16, 2002

(54) HIGH SPEED BURNISHING OF ASPERITIES IN A DISK DRIVE

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/886,517

(22) Filed: Jun. 21, 2001

(51) Int. Cl.$^7$ .............................................. B24B 49/00
(52) U.S. Cl. ............................ 451/8; 451/28; 451/317; 451/318
(58) Field of Search ................................ 451/8, 28, 63, 451/103, 183, 246, 254, 258, 317, 318, 312

(56) References Cited

U.S. PATENT DOCUMENTS

| | | | |
|---|---|---|---|
| 5,754,355 A | 5/1998 | Nakamura et al. | |
| 5,863,237 A | 1/1999 | Felts et al. | |
| 6,296,552 B1 | * 10/2001 | Boutaghou et al. | |
| 6,322,431 B1 | * 11/2001 | Schaenzer et al. | |

FOREIGN PATENT DOCUMENTS

| | | | |
|---|---|---|---|
| JP | 61224137 A | 10/1986 | |

(List continued on next page.)

OTHER PUBLICATIONS

J.S. Hopkins, S.S. So, and J.B. Voge, "Intelligent Burnishing System using a Cognizant Burnish Head," Research Disclosure, Apr. 1987, No. 276.

(List continued on next page.)

*Primary Examiner*—Joseph J. Hail, III
*Assistant Examiner*—Willie Berry, Jr.
(74) *Attorney, Agent, or Firm*—Dicke, Billig & Czaja, P.A.; Timothy A. Czaja (57) ABSTRACT

A method of burnishing an asperity on a magnetic surface of an operational disk drive. The disk drive includes a slider maintaining an MR element. Rotation of the disk relative to the slider forms an air bearing between the slider and the disk surface, generating a fly height of the slider relative to the disk surface. With this in mind, the method includes identifying the presence of the asperity. The disk speed is increased from a normal operational rate to a first burnishing rate. Further, an internal pressure of the disk drive is reduced from a normal operational pressure to a first burnishing pressure. A first burnishing fly height is thusly established at the first burnishing rate and the first burnishing pressure. In this regard, the first burnishing fly height is less than a fly height otherwise found with the disk drive operating at the first burnishing rate and the normal operational pressure. The slider is then positioned over the asperity. Finally, the asperity is contacted by the slider upon continued rotation of the disk and the first burnishing fly height. Contact between the slider and the asperity at the first burnishing fly height burnishes the asperity. In one preferred embodiment, the method further includes determining whether the asperity remains after operating the disk drive at the first burnishing rate and the first burnishing pressure for a certain time period. If the asperity has not been sufficiently reduced, the disk speed is increased to a second burnishing rate and the internal pressure is reduced to a second burnishing pressure resulting in a second burnishing fly height. Once again, the second burnishing fly height is less than a fly height that would otherwise be found with the disk drive operating at the second burnishing rate and normal operational pressure. With resulting contact between the slider and the asperity at the second burnishing rate, the asperity is further burnished.

20 Claims, 7 Drawing Sheets

FOREIGN PATENT DOCUMENTS

| | | |
|---|---|---|
| JP | 62-38561 | 2/1987 |
| JP | 62058423 A | 3/1987 |
| JP | 2-80975 A | 3/1990 |
| JP | 04155620 | 5/1992 |
| JP | 05135359 A | 6/1993 |
| JP | 05197951 A | 8/1993 |
| JP | 06096571 A | 4/1994 |
| JP | 06309636 | 11/1994 |
| WO | WO 95/12199 | 5/1995 |

OTHER PUBLICATIONS

M.A. Hajji and G.N. Weisensel, "Closed Loop Optimal Tandem Burnish/Glide Process with Variable Load," Research Disclosure, Nov. 1988, No. 295.

IBM, "Multi Zone/Head Digital Analog Covertor Compensation During Low Round Per Minute Burnishing," IBM Technical Disclosure Bulletin, vol. 38, No. 12, Dec. 1995.

IBM, "Zoned Low Round Per Minute Burnishing," IBM Technical Disclosure Bulletin, vol. 39, No. 02, Feb. 1996.

IBM, "Data Recovery Method," Research Disclosure 432116, Apr. 2000, p. 745.

* cited by examiner

HIGH SPEED BURNISHING OF ASPERITIES IN A DISK DRIVE

THE FIELD OF THE INVENTION

The present invention relates to disk drives. More particularly, it relates to a method of reducing or removing asperities on a disk surface of a disk drive.

BACKGROUND OF THE INVENTION

A magnetic disk drive apparatus is an apparatus for recording and reading data on the surfaces of spinning disks through the use of a changing magnetic field. One or more data storage disks are coaxially mounted on a hub of a spindle motor. The spindle motor rotates the disks at speeds typically on the order of several thousand to tens of thousands of revolutions-per-minute. Digital information, representing various types of data, is typically written to and read from the data storage disks by one or more transducers, or read/write heads, which are mounted to an actuator assembly and hover above the surface of the rapidly rotating disks.

The transducer head is typically in the form of a magnetoresistive (MR) head or element carried on a slider body. Oftentimes, the slider and transducer are designated as a "head". Regardless, the slider body is mounted to a flexible suspension portion of an arm assembly that is otherwise part of the actuator assembly. Further, the slider includes one or more pads that generate an air bearing upon rotation of the disk. More particularly, the slider is positioned by the actuator assembly over a surface of a disk. As the disk rotates, an air bearing develops between the slider and the disk surface, causing the slider, and thus the read/write head, to lift and fly several micro inches above the disk surface. The distance between the slider and the disk surface is often times referred to as a "fly height". In magnetic recording technology, it is desired to "fly" the slider as closely as possible to the disk surface (i.e., minimal fly height) so that the read transducer can distinguish between the magnetic fields emanating from closely spaced regions on the disk.

A common problem encountered during operation of a disk drive is the presence of one or more asperities on the relevant disk surface. In basic terms, an asperity is an unexpected projection formed on the otherwise planar disk surface. In operation, the MR element may physically contact the asperity due to the minuscule fly height. Contact between MR element and asperity can prevent reading and/or writing of data onto the disk at the particular track location of the asperity. Further, depending upon the form of the asperity and the number of contacts, the MR element itself can be damaged.

Due to their highly undesirable effects, every effort is made during disk manufacture to eliminate asperities. However, it is virtually impossible to prevent asperity formation. Further, asperities are often created post-manufacture. That is to say, during normal operation of the disk drive following assembly (or "operational disk drive"), certain events may occur causing a particle to deposit or wedge itself onto the disk surface, resulting in a deleterious asperity. Thus, it is highly desirable to provide an operational disk drive with the ability to reduce or "burnish" asperities during use.

Because the fly height will decrease with a reduction in disk speed (or rate of rotation), the most common technique for burnishing asperities is to simply reduce the disk speed. The slider is then positioned over the asperity location, and allowed to repeatedly contact and burnish the asperity with continued disk rotation. In fact, this same technique is employed during disk manufacture, except that the slider does not include an MR element that would otherwise be potentially damaged by the repeated contacts. Unfortunately, this technique is of limited applicability with more recently available disk drives configured to provide a negative air bearing. With a negative air bearing, the fly height remains virtually unchanged with the relatively small reductions in disk speed, otherwise utilized for asperity burnishment. Instead, the disk sped must be greatly reduced, to a point where the fly height is no longer stable. Further, at these low disk speeds, contact between the slider and the asperity is likely insufficient to burnish the asperity, as described below. As a result, the disk speed reduction technique for burnishing asperities is ineffective with operational disk drives utilitizing negative pressure air bearings.

A related concern associated with accepted asperity burnishing techniques, regardless of the type of air bearing employed, is that the kinetic energy generated upon contact between slider and asperity is inherently lowered with a reduction in disk speed. Obviously, the burnishing effect is diminished with lower kinetic energy. This relationship is especially problematic for negative air bearing designs where the disk speed must be dramatically reduced to provide an appropriate fly height. With this in mind, a more effective burnishing technique for an operational disk drive would entail an increase in disk speed relative to normal operational conditions. Unfortunately, the fly height becomes larger with an increase in disk speed. As such, simply increasing disk speed is not a viable burnishing technique for an operational disk drive.

Detrimental disk surface asperities are frequently encountered during operation of an assembled disk drive. Unfortunately, the accepted burnishing technique of lowering disk speed to reduce fly height is no longer applicable to current disk drive systems in which a negative pressure air bearing is formed, and is inefficient from a kinetic energy standpoint. Therefore, a need exists for a system and method of burnishing asperities with an operational disk drive with increased disk speed.

SUMMARY OF THE INVENTION

One aspect of the present invention provides a method of burnishing an asperity on a magnetic surface of an operational disk drive. The disk drive includes a slider including a pad and an MR element. Rotation of the disk relative to the slider forms an air bearing between the slider and the disk surface, the air bearing generating a fly height of the MR element relative to the disk surface. With this in mind, the method includes identifying the presence of the asperity. The disk speed is increased from a normal operational rate to a first burnishing rate. Further, an internal pressure of the disk drive is reduced from a normal operational pressure to a first burnishing pressure. A first burnishing fly height is thusly established at the first burnishing rate and the first burnishing pressure. In this regard, the first burnishing fly height is less than a fly height otherwise found with the disk drive operating at the first burnishing rate and the normal operational pressure. The slider is then positioned over the asperity. Finally, the asperity is contacted by the slider upon continued rotation of the disk at the first burnishing fly height, thereby burnishing the asperity. In one preferred embodiment, the method further includes determining whether the asperity remains after operating the disk drive at the first burnishing rate and the first burnishing pressure following a certain time period. If the asperity has not been sufficiently reduced, the disk speed is increased to a second burnishing rate and the internal pressure is reduced to a second burnishing pressure resulting in a second burnishing fly height. Once again, the second burnishing fly height is less than a fly height than would otherwise be found with the disk drive operating at the second burnishing rate and normal operational pressure. With resulting contact between the slider and the asperity at the second burnishing rate, the asperity is further burnished.

Another aspect of the present invention relates to a system for controlling operation of an operational disk drive. The disk drive includes a slider maintaining a pad and an MR element, and a magnetic disk rotated by a spindle motor. With this in mind, the system includes an asperity identifier, a spindle motor controller, an internal pressure controller, and an actuator motor controller. The asperity identifier is capable of detecting the presence of an asperity on a surface of the disk. The spindle motor controller is capable of increasing a speed of the disk from a normal operational rate to a first burnishing rate upon detection of an asperity by the asperity identifier. The internal pressure controller is capable of reducing an internal pressure of the disk drive from a normal operational pressure to a first burnishing pressure upon detection of an asperity by the asperity identifier. In this regard, the spindle motor controller and the internal pressure controller operate in concert to provide a first burnishing fly height of the slider relative to the disk surface. The first burnishing fly height is less than a fly height otherwise generated when the disk drive is operated at the first burnishing rate and the normal operational pressure. Finally, the actuator motor controller is capable of positioning the slider over the asperity at the first burnishing fly height to burnish the asperity. In one preferred embodiment, the system further includes a processor capable of prompting operation of the spindle motor controller and the internal pressure controller in accordance with a predetermined fly height correlation between disk rate and internal pressure.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
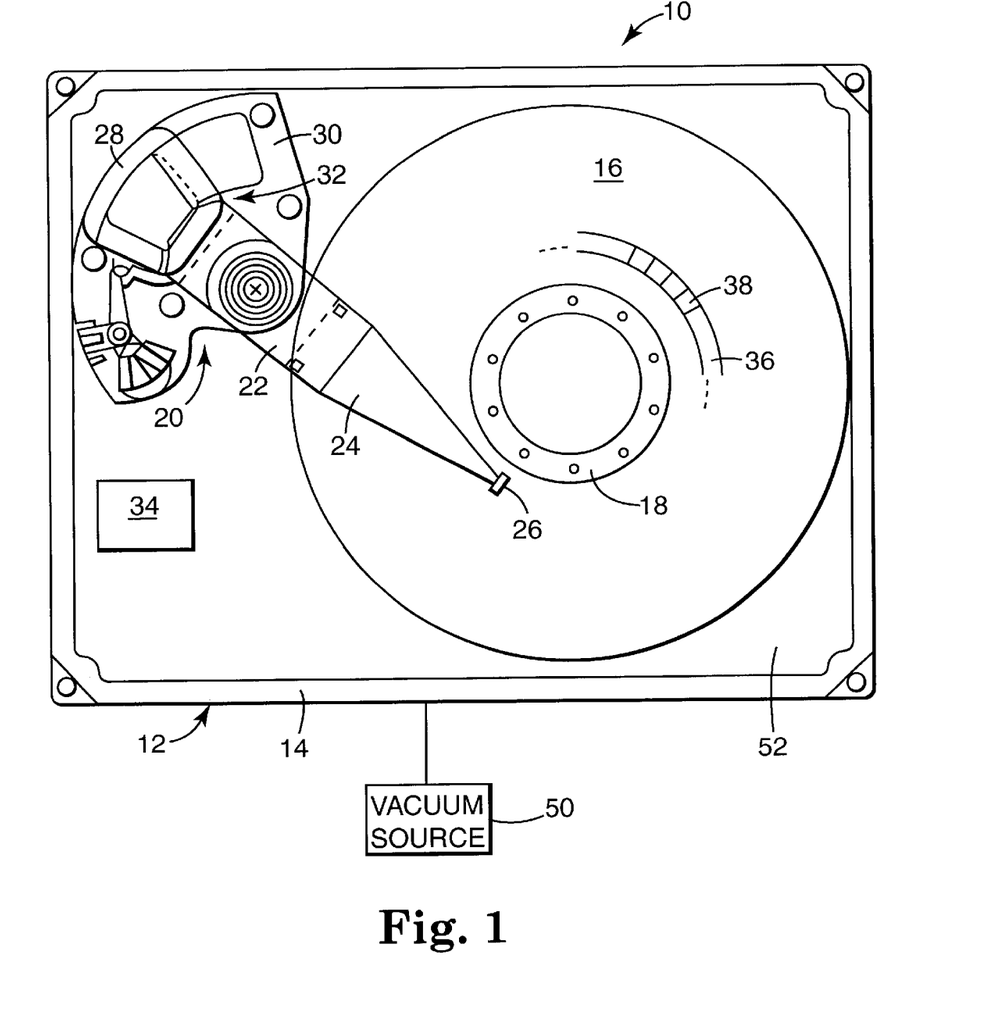
FIG. 1 is a top view of an exemplary disk drive system in accordance with the present invention with its upper housing cover removed and portions shown in block form.

An exemplary disk drive system 10 is provided in FIG. 1. As a point of reference, the disk drive 10 includes a housing 12 defined by a cover (not shown) and a base 14. For ease of illustration, the cover has been removed from the view of FIG. 1. As a further point of reference, the disk drive 10 is shown by way of example and not of limitation. Many different types of disk drive data storage devices or systems can benefit from the present invention.

With the above in mind, the disk drive 10 typically includes one or more magnetic data storage disks 16 that rotate about a spindle motor 18. An actuator assembly 20 typically includes a plurality of interleaved actuator arms 22, with each arm 22 having one or more suspensions 24 each maintaining a head or slider 26. The slider 26 is described in greater detail below, but generally includes a read head, such as an MR read element, and a write head, such as an inductive write element. Regardless, the actuator assembly 20 further includes a coil assembly 28 which cooperates with a permanent magnet structure 30 to operate as an actuator voice coil motor (VCM) 32 responsive to control signals produced by a controller 34. The controller 34 preferably includes control circuitry that coordinates the transfer of data to and from the data storage disks 16, and cooperates with the VCM 32 to move the actuator arms 22, suspensions 24, and sliders 26 to prescribed track 36 and sector 38 locations when reading and writing data to and from the disks 16.

In addition to the above, the disk drive system 10 further includes a vacuum source 50 (shown in block form) fluidly connected to an internal space 52 defined by the housing 12. As is known in the art, the internal space 52 is sealed by the housing 12. As a result, the vacuum source 50 can be employed to reduce an internal pressure within the disk drive 10. The vacuum source 50 can be a component apart from the housing 12, fluidly connected thereto by appropriate channels. Alternatively, the vacuum source 50 can be provided within the housing 12, or formed as part of a shroud that encompasses the housing 12, etc. Regardless, the vacuum source 50 is preferably electrically connected to, and controlled by, the controller 34.

Figure 2:
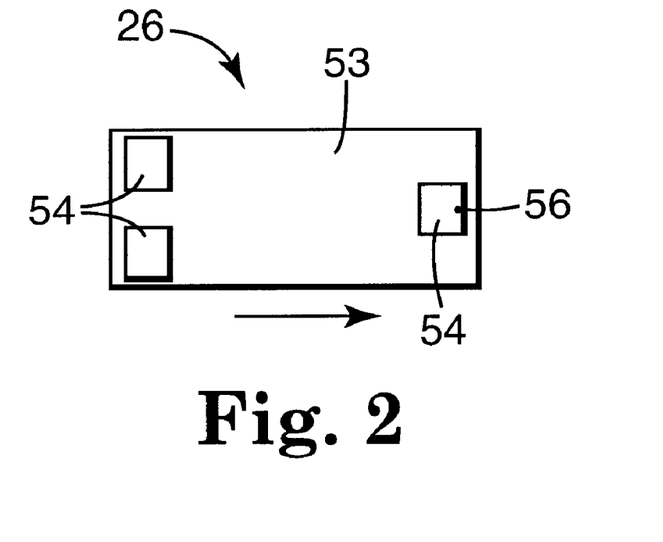
FIG. 2 is a diagrammatic, bottom view of a slider portion of the disk drive system of FIG. 1.

A bottom view of an exemplary embodiment of the slider 26 is shown in diagrammatic form in FIG. 2. The slider 26 maintains includes a support body 53 maintaining a plurality of pads 54 and at least one MR element or head 56. It is understood, of course, that normally both an MR head for reading and an inductive head for writing are present. The pads 54 are positioned along the slider 26 to generate an air bearing as the disk 16 (FIG. 1) rotates beneath the slider 26 (represented by an arrow in FIG. 2). In this regard, the slider 26 configuration of FIG. 2 results in a negative pressure air bearing. Alternatively, a wide variety of other configurations are available for the slider 26 that may or may not include the pads 54. For example, the slider 26 can be configured to provide a positive pressure air bearing as is known in the art.

Figure 3:
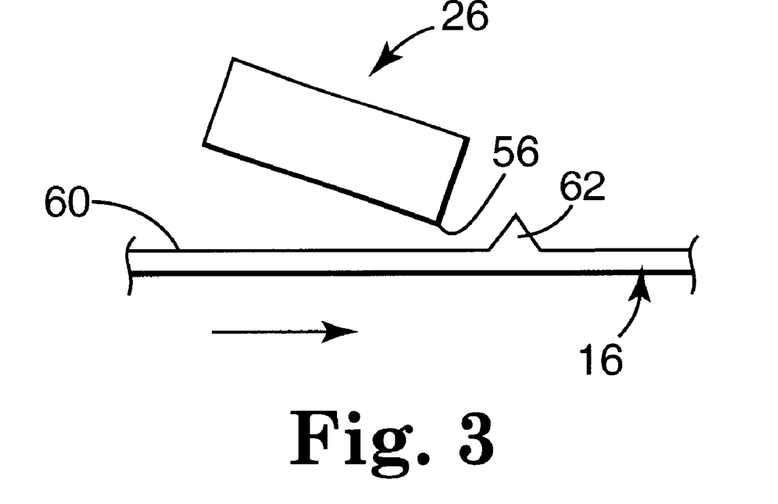
FIG. 3 is a diagrammatic, side view of the slider of FIG. 2 relative to a magnetic disk having an asperity.

FIG. 3 is a side, diagrammatic view of the slider 26 relative to a corresponding disk 16 during operation of the disk drive 10 (FIG. 1). In particular, as the disk 16 rotates (represented by an arrow in FIG. 3), an air bearing is created between the slider 26 and an outer surface 60 of the disk 16. This air bearing results in a "fly height" between the slider 26 and the outer surface 60. During manufacture or subsequent operation of the disk drive 10, an asperity 62 can be formed as an outward projection from the outer surface 60 of the disk 16. As previously described, the asperity 62 can be large enough to cause read/write errors and even damage the MR element 56. As such, the present invention provides a method and system for burnishing the asperity 62 from the outer surface 60.

Figure 4:
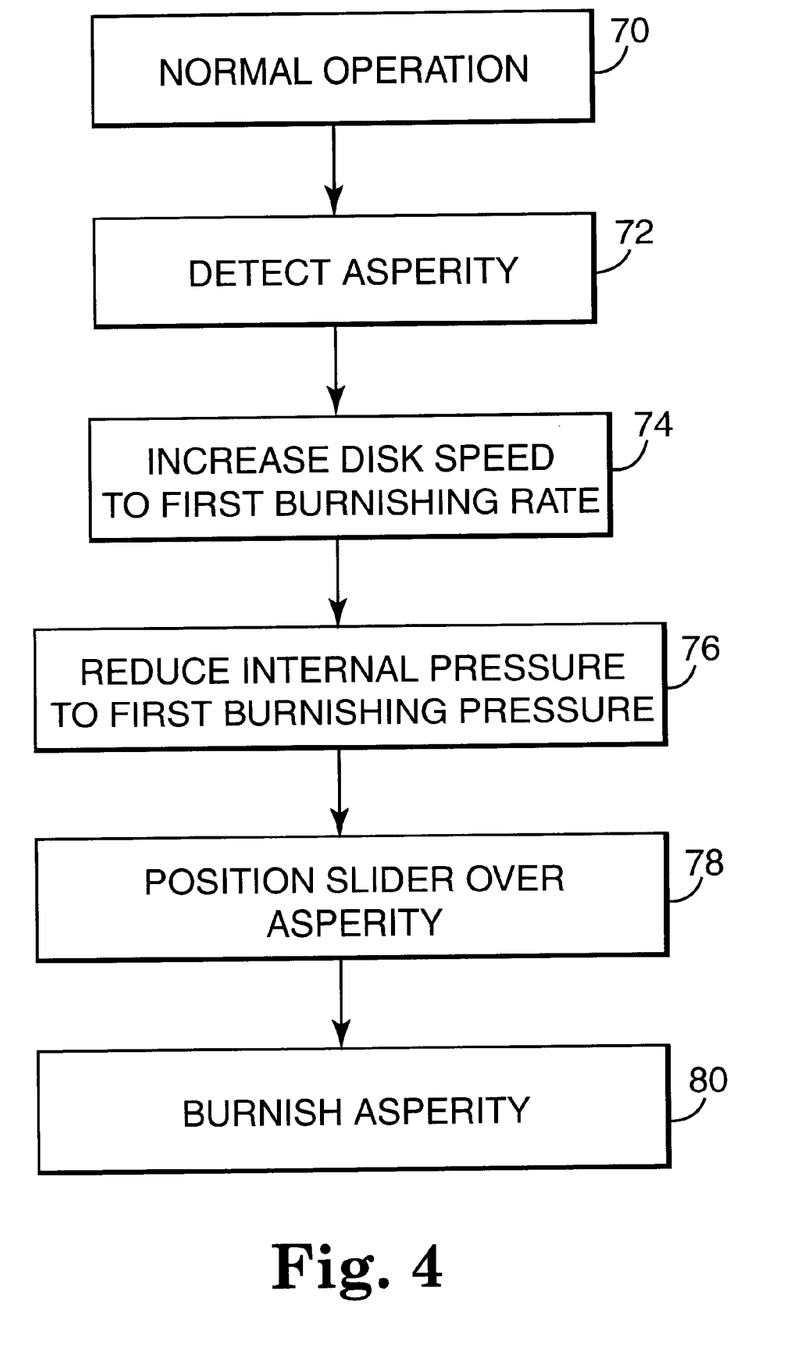
FIG. 4 is a flow diagram illustrating a preferred method of the present invention.

In particular, one preferred burnishing method is illustrated by the flow diagram of FIG. 4. As a point of reference, the preferred method is particularly useful with an operational or post-manufacture disk drive, whereby the operational disk drive is programmed to burnish the asperity 62 once identified.

With this in mind, at step 70, the disk drive 10 is operating under normal operational conditions, including an operational or nominal disk speed and operational or nominal internal pressure. By way of reference, a typical operational rate is approximately 10,000 revolutions per minute (resulting in a nominal, mid-diameter disk velocity of 30 M/s for a 3 inch disk), and a typical operational pressure is 1 Atm. With this in mind, the disk drive 10 detects or identifies the asperity 62 at step 72. In this regard, a number of known techniques are available for detecting or identifying the presence of the asperity 62. For example, it is known that heat is generated by contact between the MR element 56 and the asperity 62. This influx of heat results in a voltage spike in the signal read from the MR element 56 and otherwise delivered to the controller 34. The controller 34 can interpret this voltage spike as indicative of the presence of the asperities 62. Thus, during normal operation of the disk drive 10, the occurrence of a voltage spike will prompt the controller 34 to initiate the asperity burnishing operation. Alternatively, other known asperity detection techniques, such as air bearing resonance, are equally applicable. Further, a separate component or processor apart from the controller 34 can be provided to serve as an asperity identifier and perform the asperity identification function.

Upon detection of the asperity 62, the disk speed is increased from the normal operational rate to a first burnishing rate at step 74. Similarly, at step 76, the internal pressure of the disk drive 10 is reduced from the normal operational pressure to a first burnishing pressure via the vacuum source 50. As described in greater detail below, the reduction in internal pressure reduces the fly height to a first burnishing fly height. Importantly, the burnishing fly height achieved upon reducing the internal pressure of the disk drive 10 is less than a fly height that would otherwise be achieved were the disk drive 10 operating at the first burnishing rate and normal operational pressure.

At step 78, the slider 26 is radially positioned relative to the disk 16 so as to contact the asperity 62 upon continued rotation of the disk 16. In one preferred embodiment, the slider 26 is positioned such that the MR element 56 is slightly radially offset from the asperity 62. With this preferred positioning, the asperity 62 will not be contacted by the MR element 56; instead only the pad 54 otherwise maintaining the MR element 56 contacts the asperity 62. Regardless, repeated contact between the slider 26 and the asperity 62 at the first burnishing fly height burnishes the asperity 62 at step 80.

The above-described method of the present invention provides a distinct advantage over current techniques in which disk speed is reduced to effectuate asperity burnishment. In general terms, the burnishing energy created by the slider 26 is enhanced with an increase in disk speed and a reduction in internal pressure (and thus fly height). As such, alternative embodiment methods of the present invention include further increases in disk speed and reductions in internal pressure. For example, if the asperity 62 remains after burnishing attempts are performed at the first burnishing rate and the first burnishing pressure, the controller 34 can prompt the spindle motor 18 to increase the disk speed to a second burnishing rate and a correspondingly prompt the vacuum source 50 to reduce the internal pressure to a second burnishing pressure. Once again, this action causes the slider 26 to be positioned at a lower fly height than would otherwise be achieved were the disk drive 10 operated at the second burnishing rate but at normal operational pressure. Subsequently, if necessary, further disk speed increases and/or internal pressure reductions can be utilized until the asperity 62 has been sufficiently burnished.

It is recognized that in some instances, it is not feasible for the disk drive 10 to operate at increased disk rates/reduced internal pressures for an extended period of time. For example, because the disk drive 10 is otherwise operational, the user may not tolerate operational delays in excess of 20–30 seconds. Further, components of the disk drive 10 may experience short-term or long-term impairments. For these same reasons, it is important to return the disk drive 10 to normal operating condition as soon as the asperity 62 has been removed. With this in mind, FIG. 5 illustrates an alternative asperity burnishing method in accordance with the present invention.

Figure 5:
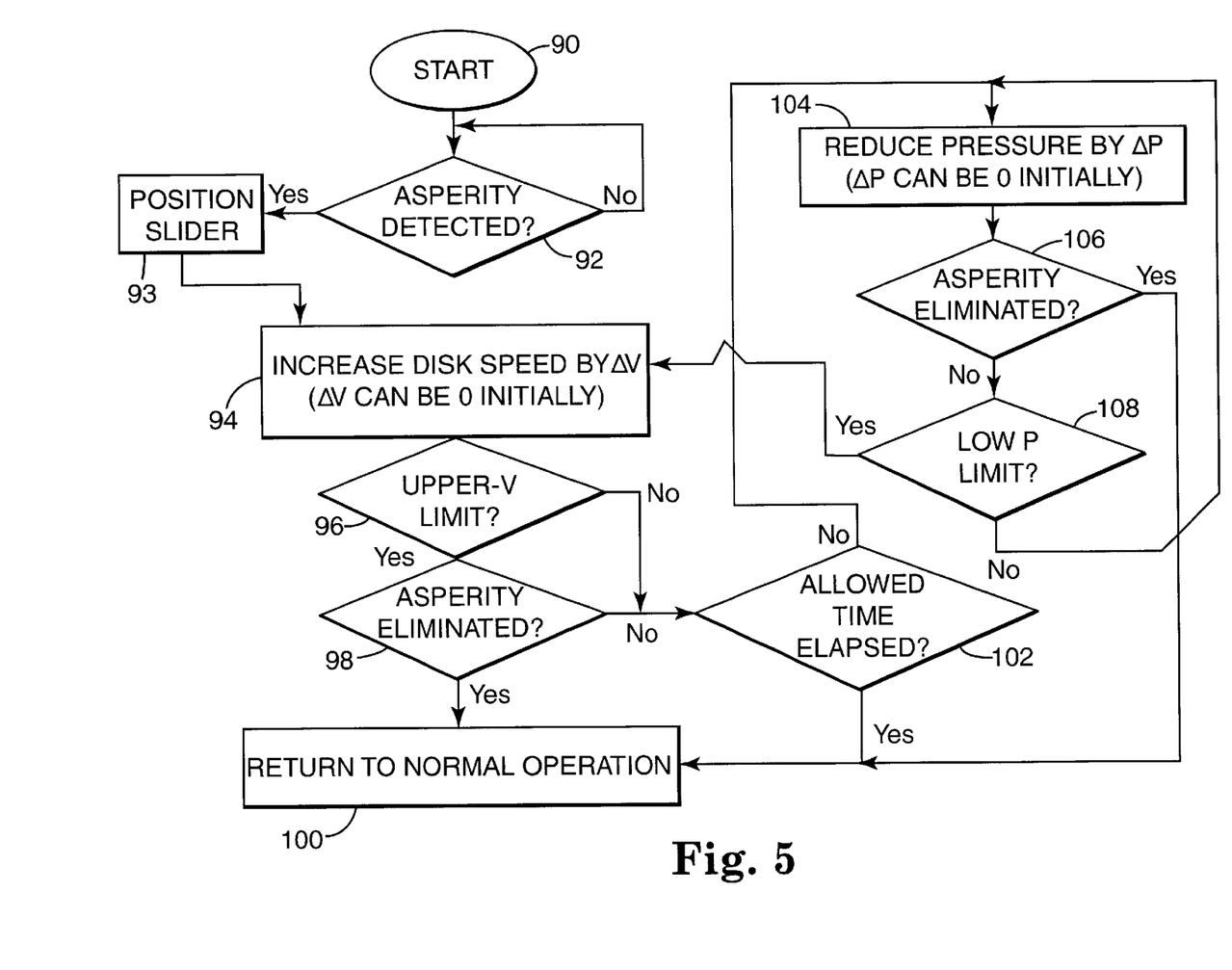
FIG. 5 is a flow diagram illustrating an alternative method of the present invention.

As with the method of FIG. 4, at the initial step 90 of FIG. 5, the disk drive 10 is operating under normal operational conditions, including a normal operational disk rate and a normal operational internal pressure. At step 92, the asperity identifier associated with the disk drive system 10 monitors the disk 16 for asperities, as previously described. If an asperity is not detected ("no" at step 92), the disk drive 10 continues to operate under normal conditions.

Conversely, if the asperity 62 is identified as being present ("yes" at step 92), the method initiates a burnishing mode of operation beginning at step 93 whereby the slider 26 is radially positioned over the asperity 26 as previously described. At step 94, the spindle motor 18 is prompted to increase the disk speed to the first burnishing rate. The increase in disk speed (? V) is preferably predetermined based upon operational parameters of the disk drive 10. To this end, and as described in greater detail below, optimal disk speed/internal pressure characteristics of the disk drive are preferably obtained during manufacture thereof. This information, along with certain safety criteria such as the ability of the spindle motor 18 to operate at elevated disk speeds, can be utilized to establish an appropriate disk speed increase. By way of example, the initial increase in disk speed (? V) can be 1000 revolutions/minute, or can be in terms of mid-diameter velocity, such as a mid-diameter velocity increase of 10 M/s. Of course, any other appropriate increase in disk speed is equally acceptable, and need not be predetermined.

In conjunction with the preferably predetermined increase in disk speed, the system and method of the present invention preferably incorporates a disk speed upper limit based upon limitations of the spindle motor 18 at step 96. For example, for a particular disk drive 10, the spindle motor 18 may be rated to have an upper limit of 15,000 revolutions per minute. This predetermined limit is stored by the controller 34 and used to control operation of the disk drive 10.

If it is determined that the disk speed upper limit has been reached ("yes" at step 96), the method continues to step 98 where a determination is made as to whether the asperity 62 has been sufficiently removed or burnished. Once again, available techniques for identifying the presence of asperities 62 can be utilized. For example, the elimination of the asperity 62 can be determined based on the absence of an asperity signature (i.e., rapid heating followed by slower cooling) that was otherwise previously detected at the same disk track and sector location. Alternatively, for asperities that are of sufficient height to excite air-bearing residence (e.g., the first pitch mode is seen most often at approximately 100 kHz for a "negative pressure" air bearing), a detection of either the magnetic or thermal spacing (i.e., proximity cooling) can be used. If it is determined that the asperity 62 has been eliminated ("yes" at step 98), the disk drive 10 is returned to normal operation at step 100 (e.g., disk velocity decreased to the normal operational rate).

Alternatively, if it is determined that the disk speed upper limit has not been reached ("no" at step 96), or if it is determined that the asperity has not been eliminated ("no" at step 98), a determination is made at step 102 as to whether operation of the disk drive 10 in the burnishing mode has exceeded a predetermined time limit. More particularly, as previously described, users will not accept a significant time delay during operation of the disk drive 10 for asperity burnishment. This time limit can vary, but is preferably on the order of 5–15 seconds, more preferably approximately 10 seconds. If the time limit has expired ("yes" at step 102), the disk drive 10 is returned to normal operation at step 100. In this case, the asperity 62 will remain, but no significant delays in disk drive operation are further incurred.

Conversely, if the predetermined time limit has not yet elapsed ("no" at step 102) the internal pressure of the disk drive 10 is reduced from a normal operational pressure to a first burnishing pressure at step 104. Similar to the increase in disk speed, the pressure reduction provided at step 104 is preferably predetermined based upon operational characteristics of the disk drive 10. In an even more preferred embodiment, the reduction in pressure (? P) effectuated by the controller 34 corresponds with the disk speed at which the disk drive 10 is then operating. By way of example, the internal pressure can be reduced by 0.25 Atm, although other ? P values are equally acceptable. As previously described the decrease in internal pressure reduces the fly height, such that a first burnishing fly height is less than a fly height otherwise achieved were the disk drive 10 operating at the first burnishing rate and normal operational pressure.

At step 106, the disk 16 is again reviewed to determine whether the asperity 62 has been eliminated. The timing of this review is preferably predetermined, for example, following operation at the first burnishing rate and first burnishing pressure over a predetermined time period of approximately 5 seconds. If the asperity 62 has been sufficiently burnished ("yes" at step 106), the disk drive 10 is returned to normal operations at step 100 (e.g., normal operational disk rate and normal operational internal pressure). Conversely, if the asperity 62 has not been removed ("no" at step 106), the internal pressure of the disk drive 10 is compared to a lower pressure limit at step 108. The lower pressure limit is preferably a predetermined value based upon operational constraints of the disk drive 10 and the internal components. Alternatively, the lower pressure limit can be based on a minimum acceptable fly height for the disk drive 10. In other words, a determination is made as to whether the current fly height is approaching a critical or potential "crash" situation. Because further reduction in internal pressure will further reduce the fly height and result in a damaging crash, the lower pressure limit analysis at step 106 serves to prevent this occurrence. If the lower pressure limit has not been reached ("no" at step 108), the method returns to step 104 whereby the internal pressure of the disk drive 10 is further reduced in hopes of eliminating the asperity 62 at step 106. Conversely, if the lower pressure limit has been reached ("yes" at step 108), the method returns to step 94 at which the disk speed is further increased. Following the increase in disk speed, the asperity 62 is further burnished as previously described.

With the method of FIG. 5, high speed burnishing is accomplished in a timely manner, with the disk drive returning to normal operating conditions as soon as possible.

Figure 6A:
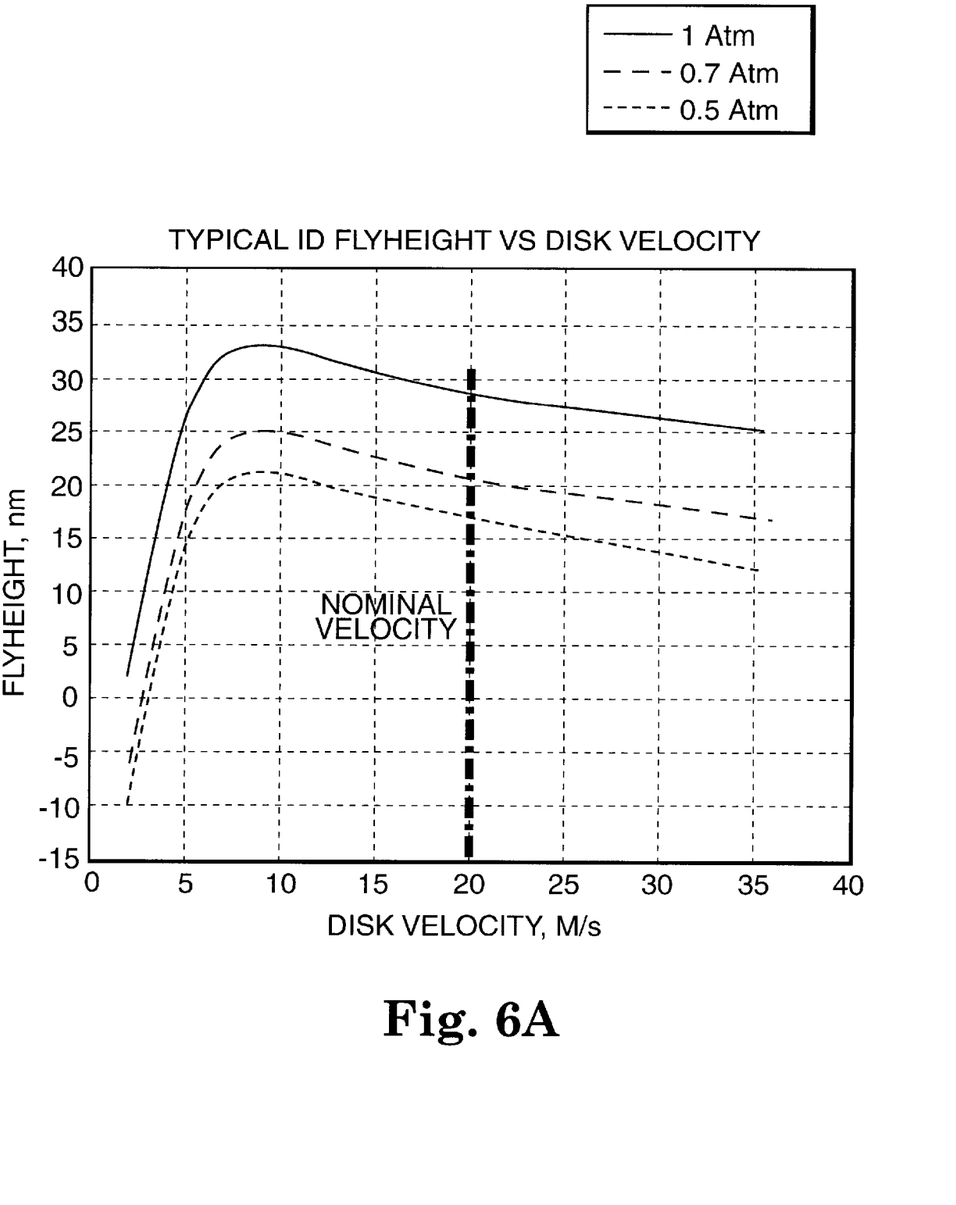
FIGS. 6A–6C are plots of fly height versus disk velocity at varying disk drive internal pressures.
Figure 6B:
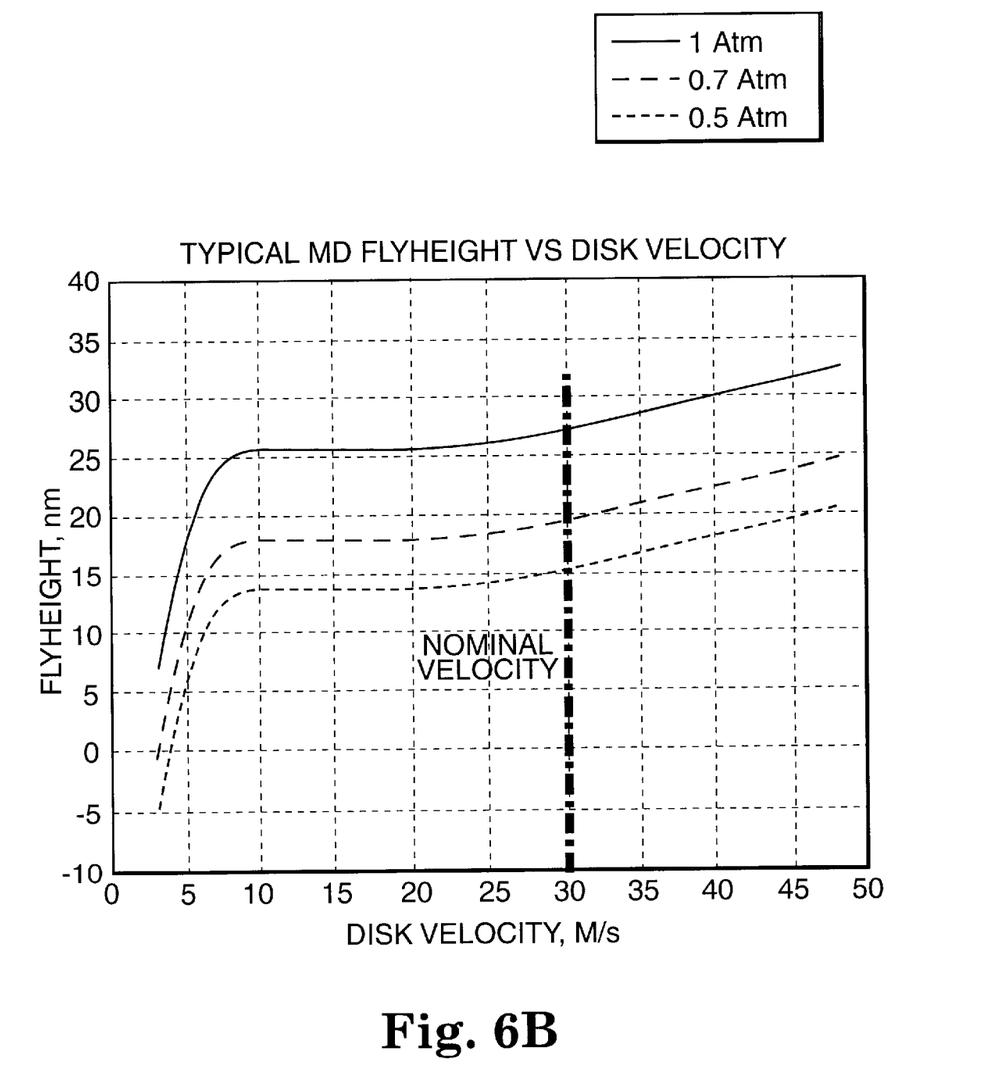
Figure 6C:
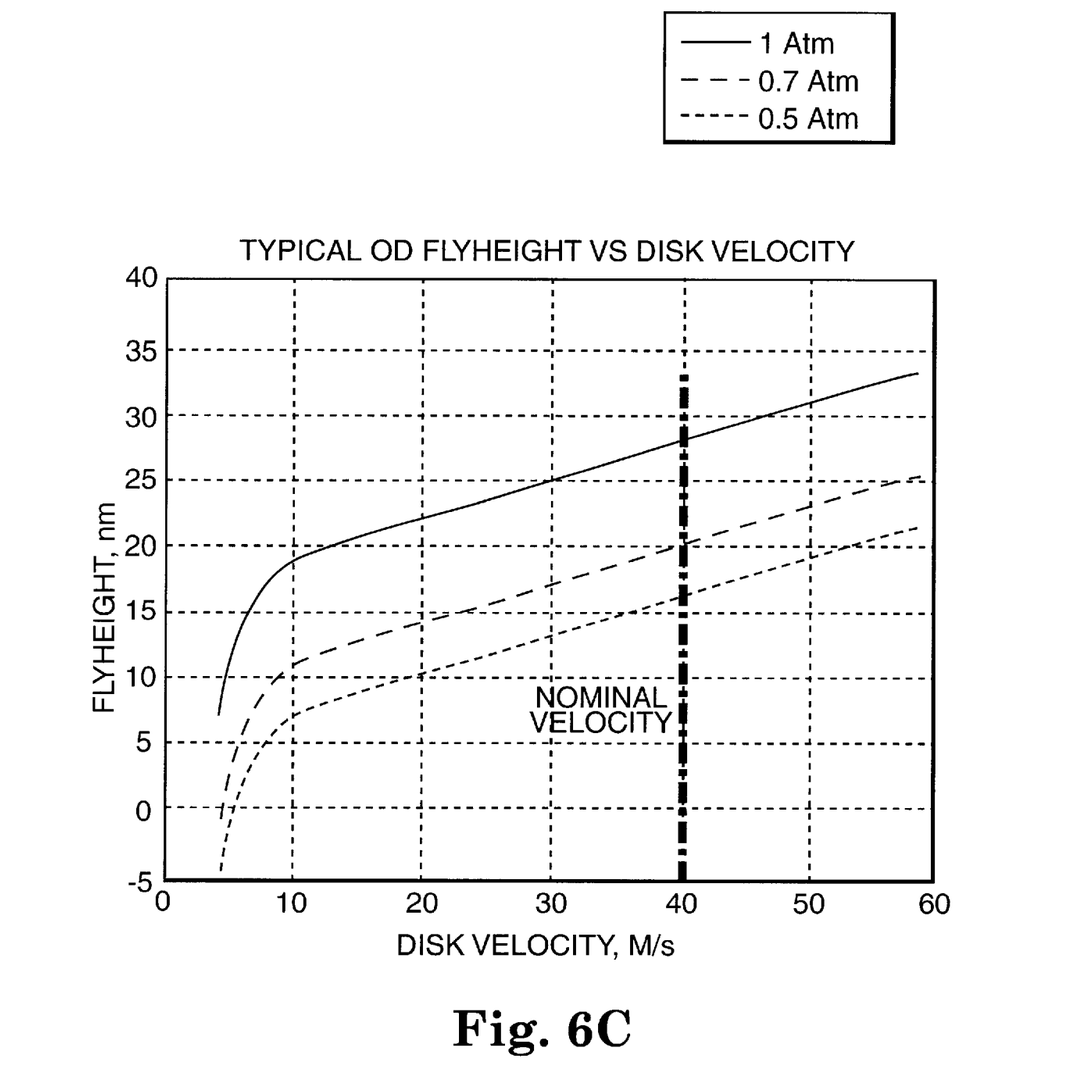

The various methods of the present invention are premised on a correlation between internal pressure and fly height. To this end, FIGS. 6A–6C graphically illustrate typical fly height versus disk velocity curves for a negative pressure type air bearing. In particular, a negative pressure air bearing was evaluated relative to a 3 inch diameter disk at various rotational speeds. In this regard, it will be recognized that the disk velocity is relative to a radial point on the disk. As such, FIG. 6A represents the fly height and disk velocity conditions at the inner diameter of the 3 inch disk; FIG. 6B represents conditions at the mid-diameter; and FIG. 6C represents conditions at the outer diameter. Each graph includes a plot of fly height versus disk velocity at 3 different pressures, including a normal operational pressure of 1 Atm, a first reduced internal pressure of 0.7 Atm, and a second reduced internal pressure of 0.5 Atm. Finally, in each of graphs of FIGS. 6A–6C, the nominal velocity has been designated with a vertical line, with data above the nominal operating velocity being extrapolated linearly.

As is clear from each of FIGS. 6A–6C, a reduction in internal pressure reduces the fly height at identical disk speeds. For example, it can be seen in FIG. 6C that at the disk outer diameter, by reducing the pressure to 0.7 Atm, the fly height at 60 M/s will be nearly the same as the fly height at 40 M/s when the internal pressure is 1 Atm. If the pressure is further reduced to 0.5 Atm, the fly height at 60 M/s is about 5 nm lower than that found at normal operational conditions. A further point derived from a comparison of FIGS. 6A–6C is that the disk velocity and internal pressure used during the asperity burnishing procedure appears to be radius dependent.

By providing both an increased disk velocity and a decreased fly height, the burnishing method of the present invention provides a distinct advantage over currently available techniques in which the disk speed is simply reduced. In this regard, burnishing energy varies by the square of disk velocity and linearly with fly height. Thus, a comparison approximation between burnishing energy at normal operational conditions versus that at some new velocity and fly height can be based upon the following equation:

$$BE_{ne}/BE_{no}=(FH_{no}/FH_{ne})\times(V_{ne}/V_{no})^2$$

where:

$BE_{no}$=burnishing energy at normal or nominal operational conditions;

$BE_{ne}$=burnishing energy at new velocity and new fly height;

$FH_{no}$=fly height at normal or nominal operational conditions;

$FH_{ne}$=new fly height;

$V_{ne}$=new velocity; and $V_{no}$=normal or nominal operational velocity.

Based upon the above approximation, the following data was obtained relating to burnishing energy enhancements achieved by simultaneous increase in disk speed and reduction in fly height via internal pressure reduction as shown in Table 1 below.

TABLE 1

| Loc | Nominal Velocity | New Velocity | Nominal Fly Height | Fly Height at 0.5 atm and New Velocity | Increase in Burnishing Energy |
|---|---|---|---|---|---|
| OD | 41 M/s | 60 M/s | 27 | 22 | 2.6 |
| MD | 30 | 45 | 28 | 21 | 3.0 |
| ID | 20 | 30 | 28 | 12 | 5.3 |

Based upon the results of Table 1 above, at the outer diameter of a 3 inch disk having a nominal velocity of 41 M/s and a nominal fly height of 27 nm (at a nominal internal pressure of 1 Atm), the burnishing energy is improved by a factor of 2.6. Burnishing energy at the mid diameter and inner diameter is similarly increased by a factor of 3.0 and 5.3, respectively.

The system and method of the present invention provides a marked improvement over previous burnishing techniques. In particular, the burnishing system and method allows for high disk speed burnishing with reduced fly heights via a reduction in disk drive internal pressure. In one preferred embodiment, the system and method ensures that the burnishing occurs in a relatively short time frame.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of burnishing an asperity on a surface of a magnetic disk of a disk drive, the disk drive including a slider maintaining an MR element, wherein rotation of the disk relative to the slider forms an air bearing between the slider and the disk surface, the air bearing generating a fly height of the slider relative to the disk surface, the method comprising:

identifying presence of the asperity;

increasing the speed of the disk from a normal operational rate to a first burnishing rate;

reducing an internal pressure of the disk drive from a normal operational pressure to a first burnishing pressure resulting in a first burnishing fly height that is less than a fly height otherwise achieved at the first burnishing rate and normal operational pressure;

positioning the slider over the asperity; and contacting the asperity with the slider with continued rotation of the disk at the first burnishing fly height to burnish the asperity.

2. The method of claim 1, further comprising:

operating the disk drive at the first burnishing rate and the first burnishing pressure for a first time period;

determining whether the asperity remains after the first time period has elapsed;

increasing the speed of the disk from the first burnishing rate to a second burnishing rate; and contacting the asperity with the slider with continued rotation of the disk at the second burnishing rate and the first burnishing pressure to burnish the asperity.

3. The method of claim 2, further comprising: p1 reducing the internal pressure of the disk drive from the first burnishing pressure to a second burnishing pressure while rotating the disk at the second burnishing rate, resulting in a second burnishing fly height that is less than a fly height otherwise achieved at the second burnishing rate and normal operational pressure.

4. The method of claim 3, further comprising:

operating the disk drive at the second burnishing rate and the second burnishing pressure for a second time period;

determining whether the asperity has been eliminated after the second time period has elapsed;

increasing the speed of the disk from the second burnishing rate to a third, burnishing rate;

reducing the internal pressure from the second burnishing pressure to a third burnishing pressure resulting in a third burnishing fly height that is less than a fly height otherwise achieved at the third burnishing rate and normal operational pressure; and contacting the asperity with the slider with continued rotation of the disk at the third burnishing fly height to burnish the asperity.

5. The method of claim 2, wherein the first time period is less than 15 seconds.

6. The method of claim 1, wherein the disk drive is operating under normal operational conditions prior to burnishing the asperity, the method further comprising:

determining that the asperity has been eliminated; and returning the disk drive to the normal operational conditions.

7. The method of claim 1, further comprising:

determining a fly height correlation between disk rate and disk drive internal pressure for the disk drive.

8. The method of claim 7, further comprising:

establishing disk speed and pressure change limitations for the disk drive, based upon the determined fly height correlation.

9. The method of claim 1, further comprising:

establishing a time limit for the disk drive to operate at the first burnishing rate and the first burnishing pressure.

10. The method of claim 1, wherein the disk drive further includes a vacuum source, and further wherein reducing an internal pressure includes activating the vacuum source.

11. The method of claim 1, wherein positioning the slider over the asperity includes:

radially locating the slider such that the asperity is not contacted by the MR element.

12. The method of claim 1, wherein the air bearing is a negative pressure air bearing.

13. The method of claim 1, wherein the air bearing is a positive pressure air bearing.

14. A system for controlling operation of disk drive including an actuator assembly controlling positioning of a slider maintaining an MR element, and a magnetic disk rotated by a spindle motor, the system comprising:

an asperity identifier for detecting the presence of an asperity on a surface of the disk;

a spindle motor controller capable of increasing a speed of the disk from a normal operational rate to a first burnishing rate upon detection of an asperity;

an internal pressure controller capable of reducing an internal pressure of the disk drive from a normal operational pressure to a first burnishing pressure upon detection of the asperity;

wherein the spindle motor controller and the internal pressure controller operate in concert to provide a first burnishing fly height of the slider relative to the disk surface that is less than a fly height otherwise generated at the first burnishing rate and normal operational pressure; and an actuator assembly controller capable of positioning the slider over the asperity at the first burnishing fly height to burnish the asperity.

15. The system of claim 14, further comprising:

a processor capable of establishing time limits for the disk drive to operate at the first burnishing rate and the first burnishing pressure.

16. The system of claim 14, further comprising:

a processor capable of prompting the spindle motor controller to increase the speed of the disk from the first burnishing rate to a second burnishing rate and to prompt the internal pressure controller to reduce an internal pressure of the disk drive from the first burnishing pressure to a second burnishing pressure, wherein the processor prompts the spindle motor controller and the internal pressure controller in response to continued detection of the asperity.

17. The system of claim 16, wherein the processor is further capable of prompting the spindle motor controller to increase the speed of the disk from the second burnishing rate to a third burnishing rate and to prompt the internal pressure controller to reduce an internal pressure of the disk drive from the second burnishing pressure to a third burnishing pressure, wherein the processor prompts the spindle motor controller and the internal pressure controller in response to continued detection of the asperity.

18. The system of claim 14, further comprising:
a processor capable of storing a fly height correlation between disk rate and internal pressure of the disk drive.

19. The system of claim 14, wherein the actuator motor controller is capable of operating in a burnishing mode in which the slider is positioned such that the asperity is not contacted by the MR element.

20. The system of claim 14, wherein the disk drive is configured to provide a negative pressure air bearing between the slider and the disk surface.

\* \* \* \* \*